United States Patent [19]
Sullivan et al.

[11] Patent Number: 5,150,336
[45] Date of Patent: Sep. 22, 1992

[54] FREQUENCY DISPERSIVE TRANSMITTING ARRAY

[75] Inventors: Shelby F. Sullivan, Solana Beach; Frank E. Gordon, San Diego; Brett D. Castile, Del Mar, all of Calif.

[73] Assignee: The United States of America as represented by the Secretary of the Navy, Washington, D.C.

[21] Appl. No.: 758,994

[22] Filed: Sep. 3, 1991

[51] Int. Cl.$^5$ .............................................. G01S 15/00
[52] U.S. Cl. ..................................................... 367/103
[58] Field of Search .......................... 367/103; 342/375

[56] References Cited

U.S. PATENT DOCUMENTS

| | | | |
|---|---|---|---|
| 3,419,845 | 12/1968 | Thiede et al. | 367/103 |
| 3,848,256 | 11/1974 | Graven | 342/375 |
| 4,119,940 | 10/1978 | Keating et al. | 367/11 |
| 4,276,551 | 6/1981 | Williams et al. | 342/375 |
| 4,403,314 | 9/1983 | Tournois | 367/100 |
| 4,661,937 | 4/1987 | Groves | 367/103 |
| 4,802,149 | 1/1989 | Moore | 367/100 |
| 4,841,489 | 6/1989 | Ozaki et al. | 367/103 |

Primary Examiner—Daniel T. Pihulic
Attorney, Agent, or Firm—Harvey Fendelman; Thomas Glenn Keough

[57] ABSTRACT

A Frequency Dispersive Transmitting Array (30) for propagating composite wave energy (10) emulates narrow-band beams (20) of different frequencies which can be simultaneously radiated in all directions, or in any subset of directions, relative to an array (42) of radiating elements (32) because of the addition and cancellation of components of wave energy (10) radiated, is disclosed. A signal source (34) provides input signals (36), having frequencies which may be acoustic or electromagnetic, which are coupled by feedline (37) to radiating elements (32) through a plurality of time delay devices (38). Each one of time delay devices (38) is interposed between successive ones of radiating elements (32) and delays emission of replicas of signals (36) therefrom by a time delay $\tau_0$ which is a multiple of the period of the dominant frequency radiated in a direction broadside to the array. Window weighting function devices (40) are coupled into feedline (37) modifying signals (36) ahead of radiating elements (32) to control the behavior of side lobes of the beam as in a conventional beam-forming array. Frequency dispersion of the beams (20) is controlled by selection of the bandwidth of input signals (36) having frequencies in a desired spectrum depending on the use of the system. Direction ($\theta$) of an object from transmitting array (30) is determinable from the frequency of wave energy (10) either directly received at the object or reflected by the object to a remote receiver, because each direction ($\theta$) corresponds to a distinct frequency (f) of transmitted wave energy (10).

27 Claims, 8 Drawing Sheets

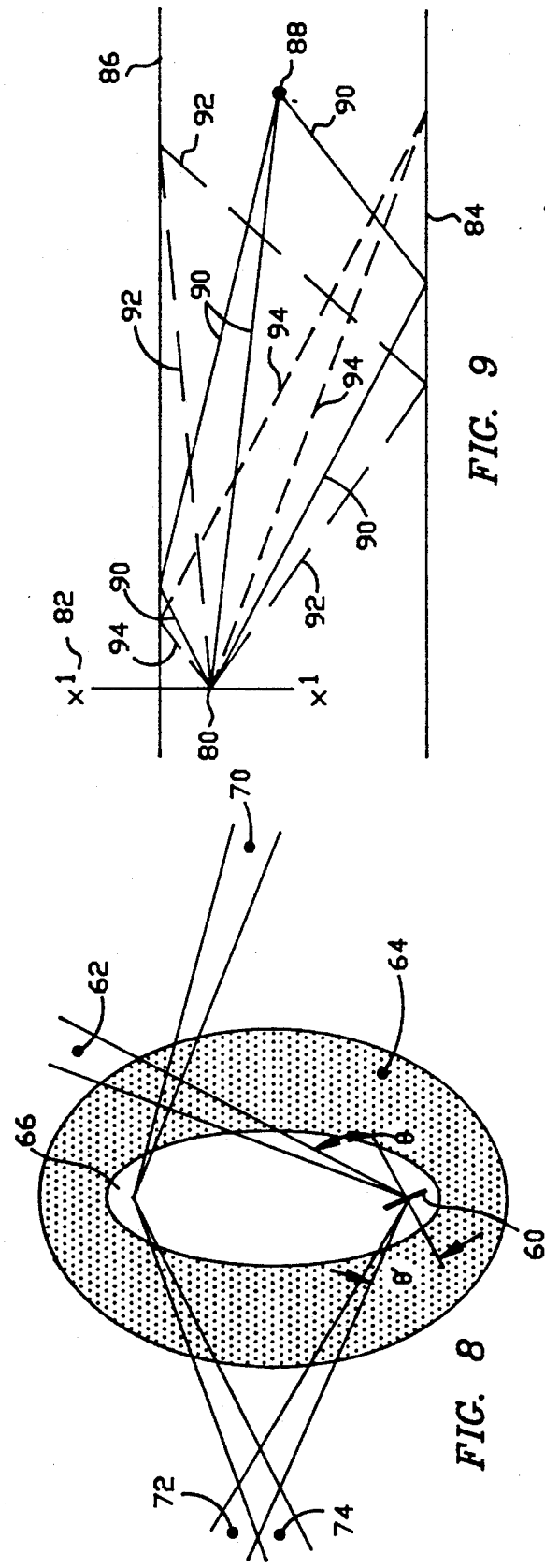
FIG. 8
FIG. 9
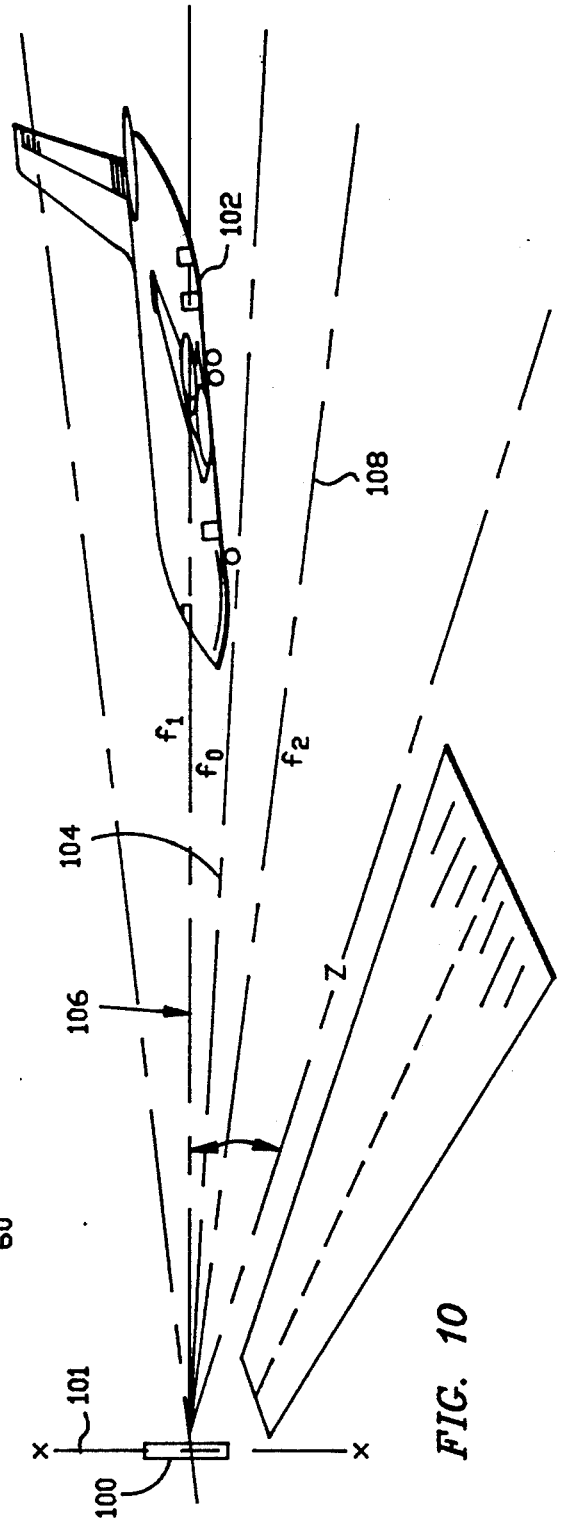
FIG. 10

FREQUENCY DISPERSIVE TRANSMITTING ARRAY

BACKGROUND OF THE INVENTION

The disclosed invention relates to systems for transmitting propagating wave energy from an array of transducers and determining the direction to the source of the wave energy or to a target reflecting such energy from the frequency of the wave motion. Known systems use frequencies ranging from those in the sound spectrum, for example sonar, to those in the electromagnetic spectrum, such as radar.

Systems containing arrays of transducers such as the linear or planar arrays utilized in sonar, sound detection and ranging of targets under water, have long been used. Conventional sonar systems are hampered by problems such as ambiguity in determining the direction of a target and reverberation. Normally, if a target echo is detected by a line receiving array, the direction to the target has two possible solutions, generally called left-right ambiguity. Detection of the echo on two widely-separated, horizontal line receiving arrays must be made simultaneously to resolve the ambiguity. Even this method of localizing is not always possible since signals are not always received simultaneously.

When conventional, long duration, large time-bandwidth product sonar signals are radiated, there is a very large area of ocean contributing to reverberation in which a target echo must be detected at any instant of time. Reverberation is a strong echo from the sea surface, sea bottom, schools of fish or plankton, which arrives at the receiver at the same time as the target echo.

A conventional beam-formed source array is able to discriminate against reverberation, but it can search in only one direction at a time. Some conventional time domain beam-forming arrays essentially create a narrow, focused beam from an array of transmitting elements and steer the beam in a given direction by changing the frequency of the transmitted signal. Other systems sequentially transmit multiple narrow beams in different directions. In conventional beam-forming systems, signals at successive radiating elements are delayed by the time required to bring them into time synchronism as they are radiated in a particular direction. Such systems can search for a target over a wide range of angles, but although such systems may be able to overcome localization ambiguities, they have inherently slow search rates.

SUMMARY OF THE INVENTION

It is an object of the present invention to provide arrays of wave-energy radiators that can simultaneously radiate energy in all directions while retaining characteristics of directional arrays. The Frequency Dispersive Transmitting Array is a method and apparatus for propagating wave energy from an array of radiating elements such that the frequency of the wave motion along any direction from the transmitting array is a function of such direction. Utilizing the present invention, an array can simultaneously generate virtually an infinite number of beams over a range of angles from $-90°$ to $+90°$ with respect to the broadside direction from the array, each beam at a different frequency, because of the addition and cancellation of components of the signal radiated from each radiating element of the array. The energy radiated from an array can be acoustic or electromagnetic.

For any narrow frequency band contained within a broad band of generated frequencies radiated by the array, the radiation pattern is that of a conventional, planar array steered in a direction determined by frequency. However, the principal of the Frequency Dispersive Transmitting array is different than that of conventional time domain beam-forming arrays and the resulting characteristics of the radiated energy is unique. In the disclosed invention, the same broad-band signals are transmitted by each radiating element, but the emission of replicas of the signals from successive elements is delayed. The delay time is a multiple of the period at the dominant frequency $f_0$ radiated in a direction broadside to the array. Time delays used in the invention are considerably longer than those used in conventional beam-forming arrays. The successively delayed signal replicas are propagated from each radiating element as wave energy and combine in the far field in a manner such that each component frequency adds constructively in a unique direction broadside from the transmitting array.

There is an analogy between the present invention and light which has passed through a diffraction grating. The succession of slits in the grating are analogous to the succession of transmitting elements in the Frequency Dispersive Transmitting Array of the present invention. In the case of the diffraction grating, the time delays result from the varying propagation distances from successive slits for light energy that has diffracted into directions different from the incident illumination. The first order spectrum is radiated in a direction such that the propagation path from successive slits varies by one wavelength. For closely ruled gratings, there are multiple spectra at successively larger diffraction angles. These higher order spectra occur at diffraction angles such that the propagation path length from successive slits varies by multiples of the wavelength. This multiple is called the order number of the spectrum. In the frequency dispersive arrays described in this invention, the time delays are produced electronically. The order number is then an integer which is the ratio of the inter-element time delay to the period of center frequency of the signal which is transmitted broadside to the array and is defined herein as such.

The combined, propagated wave energy, emulates narrow-band beams which can be simultaneously radiated in all directions, or in any subset of directions, relative to the transmitting array, in which the center frequency of each beam corresponds to the angle between the beam and the broadside direction from the transmitting array. Control of the dispersion of the beams is achieved by selection of the bandwidth of radiated signals, the distance between array elements, and by the inter element time delay. By use of an appropriate, extremely broad-band signal, a far field radiation pattern of 180° of dispersion can be achieved. Conversely, the bandwidth of radiated signals can be progressively reduced to that of a narrow-band signal producing a far field radiation pattern more nearly like that of a single, narrow-band beam. If selected bands of broad-band signals are transmitted, distinct multiple beams each having a unique frequency as a function of direction may be simultaneously created in the far field, contiguous or not.

The invention solves problems with conventional sonar such as reverberation and localizing ambiguities.

The invention, when operated at sound frequencies in a sonar application, permits a target to be localized by use of a single horizontal linear receiving array, replacing the two horizontal linear receiving arrays required with a conventional omnidirectional sound source. By using the disclosed invention, the direction of an underwater target with respect to the transmitting array can be determined from the frequency of a received echo. Correlation in time of a received echo with the transmitted signal, for example, by radio link, will resolve the ambiguity. If the received signal is not correlated with the transmitted signal, use of two receiving arrays will always resolve the ambiguity. Use of the invention permits simultaneous insonifying of a large ocean area to detect a target at any instant in time while suppressing reverberation from non-target echoes which would otherwise adversely affect detection. A Frequency Dispersive Transmitting Array discriminates against reverberation because only the areas of ocean near the target will reflect signals at frequencies representing the direction to the target while reverberation from areas not adjacent to the target will reflect at different frequencies.

It should be immediately evident that the invention has application to other, diverse fields where problems of unwanted reflections interfere with the determination of direction to a transmitting array. Determination of the bearing to other aircraft is essential in a collision avoidance system. Aircraft equipped with the disclosed invention can transmit relative bearing to other aircraft in all directions at once. Because of the unique ability of the present invention to simultaneously cover a wide field while emulating narrow, radiated beams within narrow frequency bands, it has application to a simple rapid-scanning radar system. In ultra-sonic imaging, particularly in medicine, use of this invention in conjunction with a conventional, beam-forming, linear receiving array on orthogonal axes would permit the rapid construction of a three dimensional representation of internal body structure, even if moving.

Such applications described above and others which could be envisioned, would satisfy long-felt needs in anti-submarine warfare, aviation and the medical profession.

An appreciation of other aims and objectives of the present invention and a more complete understanding of this invention may be had by studying the following description of a preferred embodiment and by referring to the accompanying drawings.

BRIEF DESCRIPTION OF THE DRAWINGS

FIG. 8 is a plan-view diagram of the invention operating as a horizontal array in conjunction with a horizontal line receiving array, illustrating the suppression of reverberation from the large background area irradiated by the transmitted omni-directional beam.

FIG. 9 is a cross-section view of the invention operating as a vertical array in a sonar application, illustrating discrimination against non-target reflections from the surface of the sea and the bottom.

FIG. 10 is a perspective view of the invention operating in an aircraft instrument landing system application.

DETAILED DESCRIPTION OF A PREFERRED EMBODIMENT

The preferred embodiment described in the following paragraphs is representative of a sonar application. The example used should not be thought of as limiting in any way the application of the disclosed invention but because such equipment is generally familiar, it serves as a vehicle for understanding the concepts and principles embodied in the invention. The invention is not limited to sonar applications but is applicable to many other systems such as, for example, radar. Referring to FIGS. 1(a), 1(b), 2, 3, 4(a), 4(b), 4(c), 5(a), 5(b), 5(c), 5(d), 5(e), 6(a), 6(b), 6(c), 6(d), and 6(e) will aid in understanding the principles of the invention. FIGS. 7, 8, 9 and 10 illustrate some other applications of the invention.

Figure 1A:
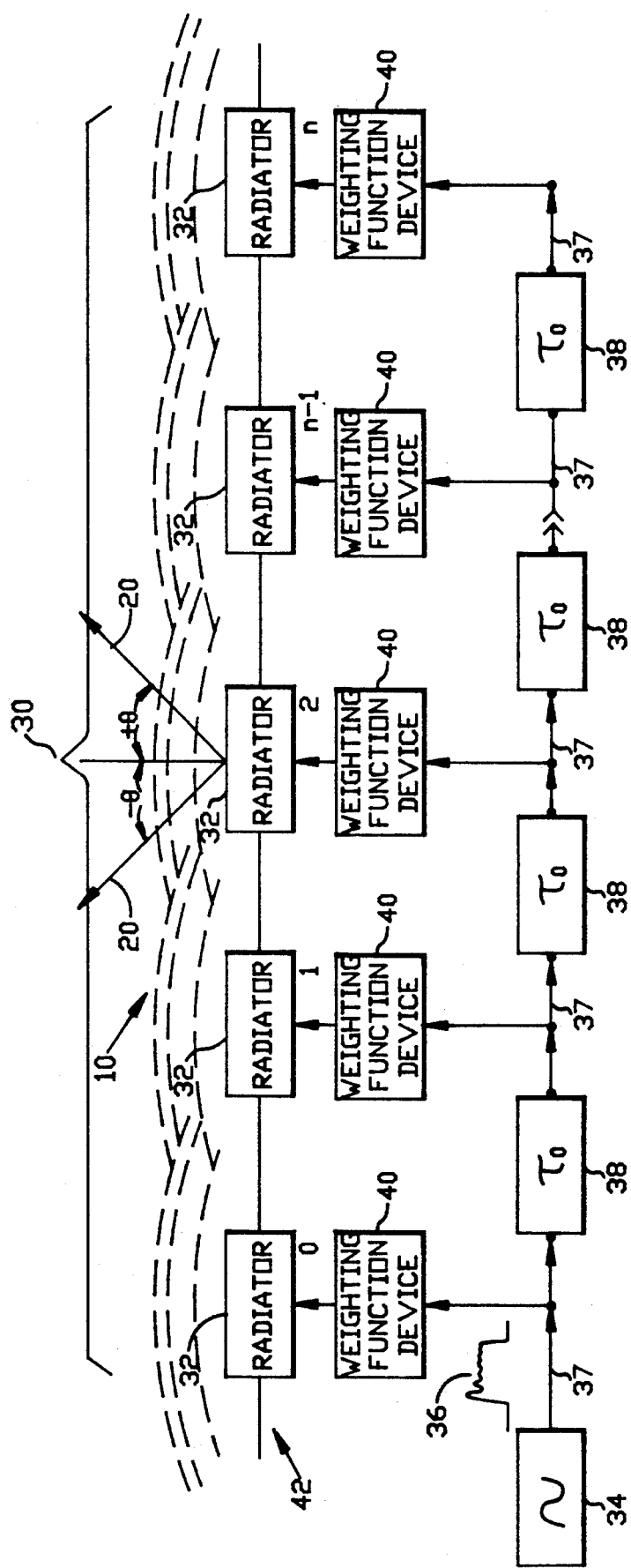
FIG. 1(a) is a schematic diagram representing the general arrangement of a preferred embodiment of the Frequency Dispersive Transmitting Array.

FIG. 1(a) depicts the arrangement of the components of the Frequency Dispersive Transmitting Array made in accordance with the principles of this invention. Propagating, composite wave energy 10 is radiated from a transmitting array 30 which has a series of radiating elements 32 arranged in a array 42, which has a radiation pattern. Array 42 may be linear or planar but need not be. Input signals 36, derived from signal source 34, are coupled to radiating elements 32 through a plurality of time delay devices 38, each one of time delay devices 38 being interposed between each successive one of radiating elements 32 and providing time delay $\tau_0$. Radiating elements 32 are coupled to time delay devices 38 and time delay devices 38 are in turn coupled to signal source 34 by means of feedline 37 or the like. A plurality of window weighting function devices 40 are coupled into feedline 37 ahead of each one f radiating elements 32, and control the behavior of side lobes and shape of the main lobe of the beam as in a conventional beam-forming array. Window weighting function devices 40 may be used that produce weighting functions such as be Kaiser-Bessel, Hamming, Hanning, or Dolph-Chebychev, as examples. Input signals 36 fed to the transmitting array 30 have frequencies in a desired spectrum depending on the use of the system. For sonar use or acoustic imaging, the frequencies would be in the sound spectrum. For radar, instrument landing systems or collision avoidance systems, the frequencies would be in the microwave region of the electromagnetic spectrum. Other envisioned systems would use well-known frequencies, electronic and mechanical elements selected as appropriate to their particular needs.

In FIG. 1, by way of example, radiating elements 32 comprise acoustic radiators and time delay devices 38 comprise L-C circuit elements. In other embodiments, for example those employing radio-frequency or microwave energy, radiating elements 32 may comprise electromagnetic radiators such as dipole antenna elements, and time delay devices 38 may comprise delay-line circuit elements or serpentine waveguides. For purposes of this discussion, the first one of radiating elements 32 is numbered "0" and the last one of radiating elements 32 is numbered "n".

In this embodiment, signal source 34 generates input signals 36, having broad-band acoustic characteristics. Broad-band signals are defined here as signals which have a bandwidth greater than $f_0/(nm)$ where $f_0$ is the center frequency of the signal, n is the number of elements in the array, and m is the order number of the time delay. The order number, m, is an integer, and is the ratio of the signal time delay between succesive elements to the wave period at the center frequency. Signals with a bandwidth greater than this will cause energy to be radiated into a spectrum of angles significantly wider than the narrow band beamwidth of the array. By contrast, narrow band signals are defined as signals whose bandwidths are narrower than $f_0/(nm)$. Broad-band signals are those which have enough band width to cause energy to radiate into a spectrum of directions significantly greater than the monochromatic beamwidth of the array. Narrow-band signals are used typically in prior art beam-forming systems. Replicas of broad-band, input signals 36 are transmitted from each or the radiating elements 32 in the array, but time delay devices 38 provide a delay time of $\tau_0$ between the time of emission of the replicas of input signals 36 from each successive one of the plurality of radiating elements 32. The delay time between replicas of input signals 36 as transmitted from radiating element "0" and radiating element "n" is $n \times \tau_0$.

Each time delay $\tau_0$ is equal to a mulitple of the period of the dominant frequency $f_0$ of the frequencies of broad-band, input signals 36. Time delay $\tau_0$ may be either positive or negative. Signal source 34 can feed array 42 from the left-hand side beginning with the first of radiating elements 32, numbered "0", as shown (positive time delay $\tau_0$) or from the right-hand side of array 42 beginning with number "n" of radiating elements 32 (negative time delay $\tau_0$). The relationship between dominant frequency $f_0$ and time delay $\tau_0$ is given in equation (1).

$$f_0 = \frac{m}{\tau_0} \qquad \text{(Equation 1)}$$

where order number m is an integer.

Components of input signals 36 transmitted by each one of radiating elements 32 in array 42 will add constructively in the far field such that propagating, composite wave energy 10 at the dominant frequency $f_0$ will appear in the far field at a direction broadside to array 42. Propagating, composite wave energy 10 at each other frequency in the band of frequencies will add constructively in the far field along each other direction $\theta$ of a plurality of directions from array 42. Each direction $\theta$ corresponds to a distinct frequency in the band of frequencies transmitted by each one of radiating elements 32.

In this invention, propagating, composite wave energy 10 emulates narrow-band beams which are simultaneously radiated in all directions $\theta$, or in any subset of directions $\theta$, from $-90°$ to $+90°$ measured from the broadside direction from the array 42. The center frequency of each narrow-band beam 20 corresponds to the direction $\theta$ of the main lobe of beam 20. Control of beam 20 dispersion is achieved by selection of the bandwidth of input signals 36. By use of appropriate, extremely broad-band input signals 36, a far field radiation pattern of 180° of dispersion can be achieved. Conversely, the bandwidth of input signals 36 can be progressively reduced to that of a narrow-band signal, producing a far field radiation pattern more nearly like that of a single, narrow-band beam 20. If selected bands of broad-band, input signals 36 are transmitted, distinct multiple beams are created in the far field, contiguous or not.

Figure 1B:
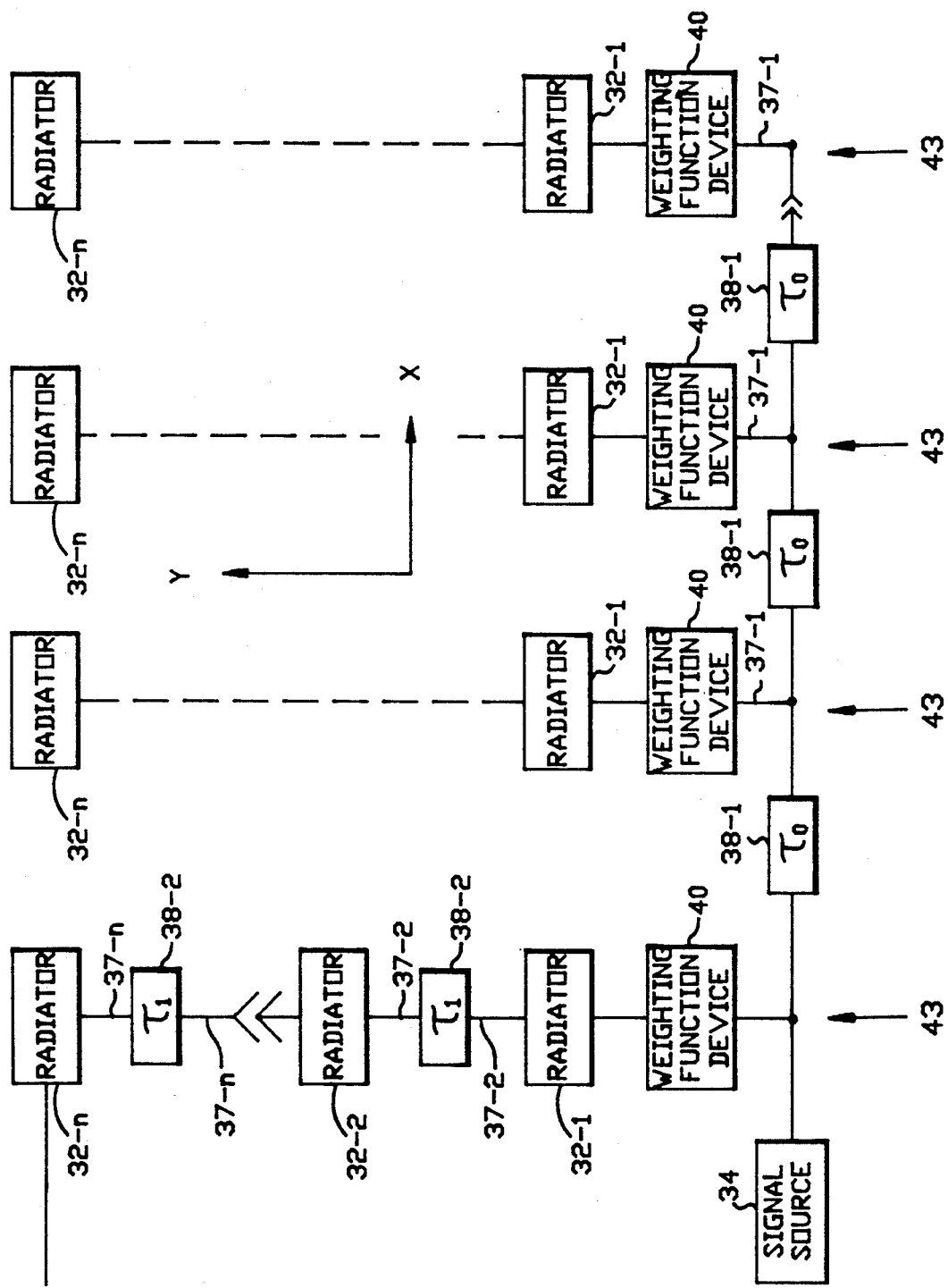
FIG. 1(b) is a schematic diagram representing the general arrangement of another form of array that may be utilized in the invention.

FIG. 1(b) depicts another form of array that may be utilized in the present invention. In that embodiment, signal source 34 feeds radiating elements 32-1 to 32-n arranged uniformly in array 42, which may, for example be planar. A plurality of radiating lines 43 of radiating elements 32-1 to 32-n are arranged and fed successively along direction "X". Each of radiating elements 32-1 to 32-n is arranged successively along direction "Y". Each one of radiating lines 43 is coupled through one of a plurality of feed lines 37-1 to signal source 34. Each one of a plurality of first time delay devices 38-1, each having a time delay $\tau_0$, is interposed in feed line 37-1 along the "X" direction between each successive one radiating lines 43. Each one of a plurality of second time delay devices 38-2, each having a delay time $\tau_1$, is interposed in feed lines 37-2 to 37-n between each successive one of radiating elements 32-1 to 32-n. Values of each second time delay $\tau_1$ are generally within one-half to three-quarters wave length, but not limited thereto, and can be positive or negative. Values of second time delay $\tau_1$ may be determined by conventional beam-forming theory. Furthermore, time delay $\tau_1$ and time delay $\tau_0$ may be different in value or alternatively the same value. Each one of radiating lines 43 transmits either broadband signals 36 or a time-delayed version of broad-band signals 36. Window weighting function devices 40 are coupled into feed lines 37-1 ahead of the first row of radiating elements 32-1. The weighting functions may be the same as in the first embodiment, depicted in FIG. 1(a) and will produce the same effects.

Figure 2:
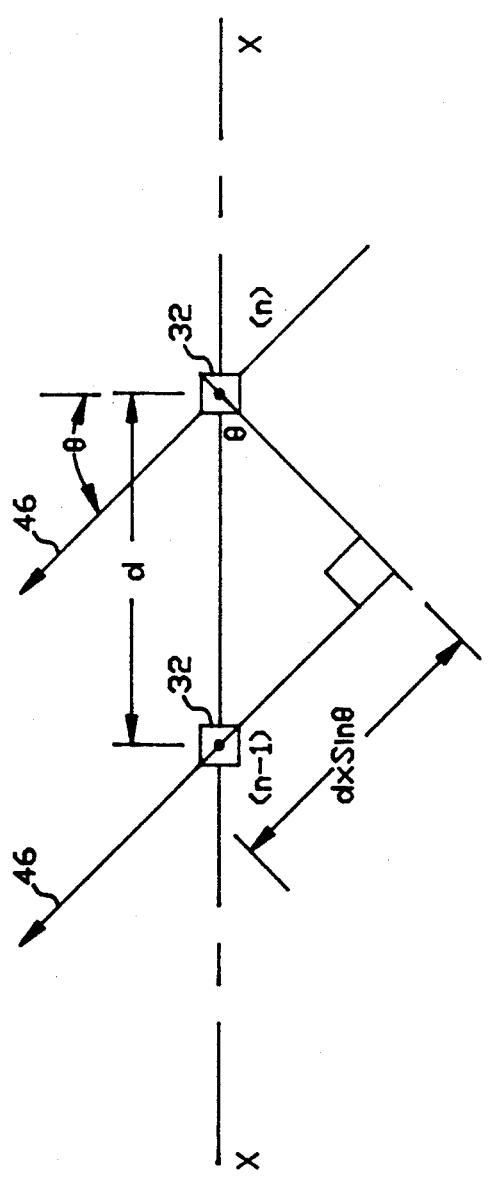
FIG. 2 is a diagram illustrating the difference in path length from the transmitting array to a receiver between two successive signal replicas propagated in a direction toward the receiver, useful in explaining the invention.

FIG. 2 will aid in understanding how the frequency of composite wave energy 10 depends distinctly on the direction $\theta$ to a receiver from array 42. FIG. 2 depicts the difference in path length along two paths 46 to a receiver for composite wave energy 10 radiated from any two successive radiating elements 32 arranged at spacing d. The difference in path lengths causes differences in the time composite wave energy 10 is received by the receiver from each transmitting element 32. This time difference results in a phase difference between signals received in the far field in any medium. Wave energy 10 is reinforced or canceled depending on the frequency and the direction of the receiver from the transmitting array according to well-known principles. Each component frequency f of the replicated input signals 36 transmitted from each radiating element 32 will add in phase, along direction $\theta$ from array 42, as determined by equation (2):

$$f = \frac{m}{\tau_0 - \frac{d\sin\theta}{c}} \quad \text{(Equation 2)}$$

where c is the velocity of propagation of wave energy 10 in the medium, d is the spacing between radiating elements 32 and order number m is an integer.

A useful definition is that of a Mach number, M, for an array. It is the ratio of the speed at which the radiated signal is propagated along the array with the electronic time delays, to the speed of wave propagation in the surrounding medium.

$$M = \frac{d/\tau_0}{c} \quad \text{(Equation 3)}$$

Using this definition equation (2) becomes:

$$f = \frac{m}{\tau_0(1 - M\sin\theta)} = \frac{f_0}{1 - M\sin\theta} \quad \text{(Equation 4)}$$

Conventionally beamformed arrays tend to have Mach numbers greater than or equal to 1. A conventionally beamformed array steered broadside has a Mach number of infinity. A conventionally beamformed array steered endfire has a Mach number of 1. There is also a technique referred to as "oversteering" an array in which the Mach number is lightly less than 1. By contrast, the Frequency Dispersive Arrays of the present invention should have Mach numbers considerably less than 1.

Figure 3:
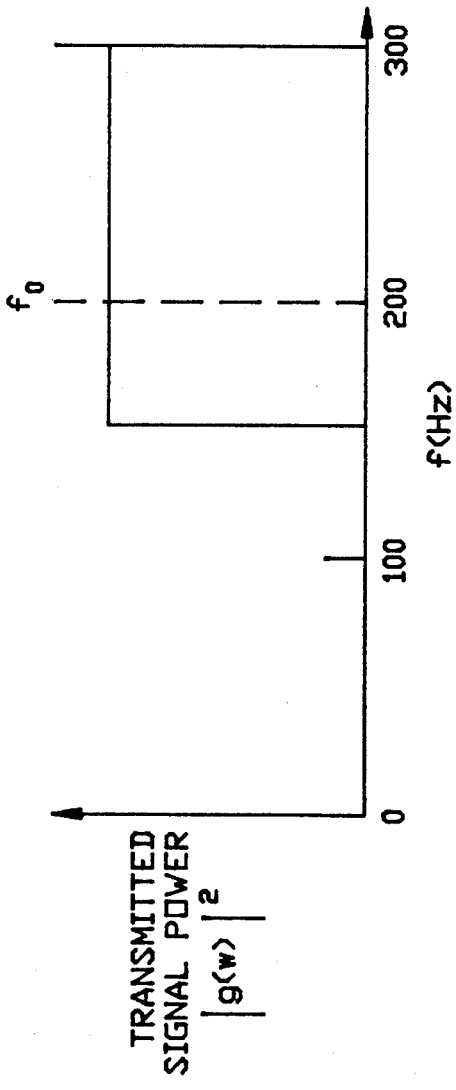
FIG. 3 is an example of a broad-band waveform spectrum transmitted from each single radiating element of a Frequency Dispersive Transmitting array.

An understanding of the way the far field signal power at various frequencies of the wave energy 10 varies with direction $\theta$ from array 42 may be gained with the aid of FIGS. 3, 4(a) through (d), 5(a) through (e), 6(a) through (e) and by reference to transmitting array apparatus 30 constructed in accordance with this invention, as depicted in FIG. 1. From inspection of FIGS. 3 and 4(a) through (d) it should be readily seen that the present invention can achieve simultaneous radiation of wave energy 10, from a single transmitting array apparatus 30, emulating beams projected into all or any subset of directions relative to array 42. FIG. 3 is an example of the spectrum of input signals 36 supplied to transmitting array apparatus 30 from signal source 34, covering a band which will cause array 42 to radiate in all directions. The input signal 36 is "white" or flat from a frequency of 150 Hz to 300 Hz. A flat spectrum, however, is unnecessary and in some applications would be undesirable. It is assumed that array 42 is constructed with a spacing d of 2.5 meters between acoustic radiating elements 32. It is further taken that the speed of sound in water is 1500 meters per second. Under these conditions, spacing d between radiating elements 32 is equal to one-third wave length at a frequency of 200 Hz. If the inter-element delay time $\tau_0$ is made equal to 1/200 second, then the center frequency $f_0$ of the wave energy 10 broadside to array 42 will be 200 Hz, when m=1, as determined from equation (1). Selection of m=1 is possible in underwater acoustics since signal bandwidth can often be a large fraction of center frequency $f_0$. This is not necessarily the case for other applications which are discussed later.

Figure 4A:
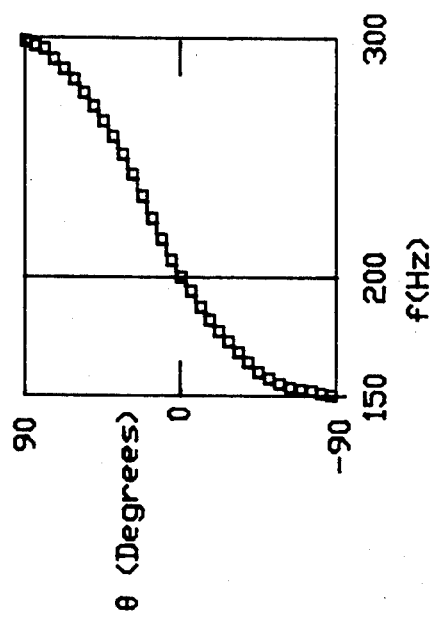
FIG. 4(a) is a diagram illustrating the relationship of the direction from a Frequency Dispersive Transmitting Array and the center frequency of a beam segment propagated along that direction.

In FIG. 4(a), direction $\theta$ of the main beam lobe from array 42 at various frequencies of propagating, composite wave energy 10 is plotted. Values of $\theta$ are calculated from equation (2). In FIG. 4(a), $\theta=0$ for a beam launched broadside to array 42.

Figure 4B:
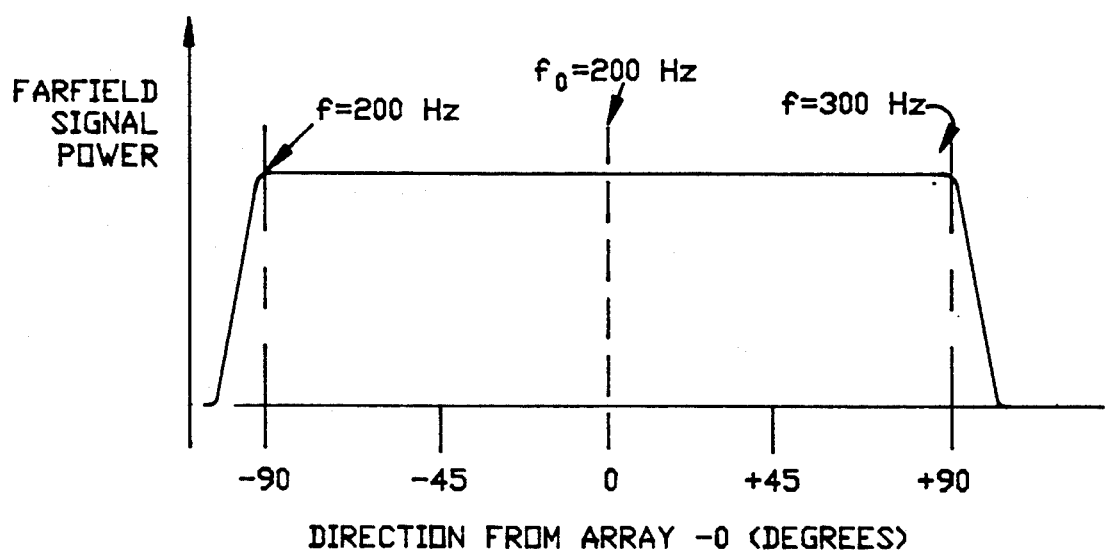
FIG. 4(b) is a diagram illustrating the beam components of the composite wave energy received in the far field when the signals transmitted from a Frequency Dispersive Transmitting Array have the waveform spectrum depicted in FIG. 3.

FIG. 4(b) depicts the far field radiation pattern achieved when broad-band input signal 36, which have a spectrum as shown in FIG. 3, are radiated by transmitting array apparatus 30. The pattern is essentially uniform in signal power from $\theta=-90°$ to $\theta=+90°$. Frequencies within the pattern vary according to equation (2).

Figure 4C:
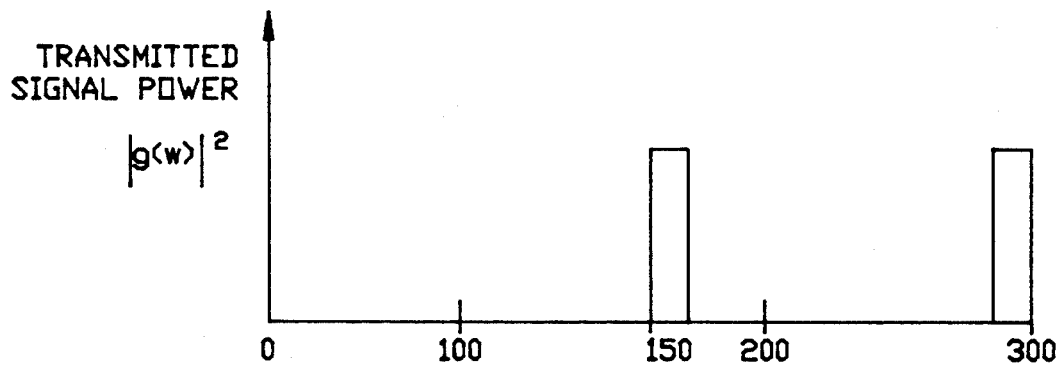
FIG. 4(c) is an example of a waveform spectrum transmitted from each single radiating element of a Frequency Dispersive Transmitting Array, chosen to achieve simultaneous projected beams in a subset of directions in the regions of −90° and +90° to the broadside direction from the transmitting array.
Figure 4D:
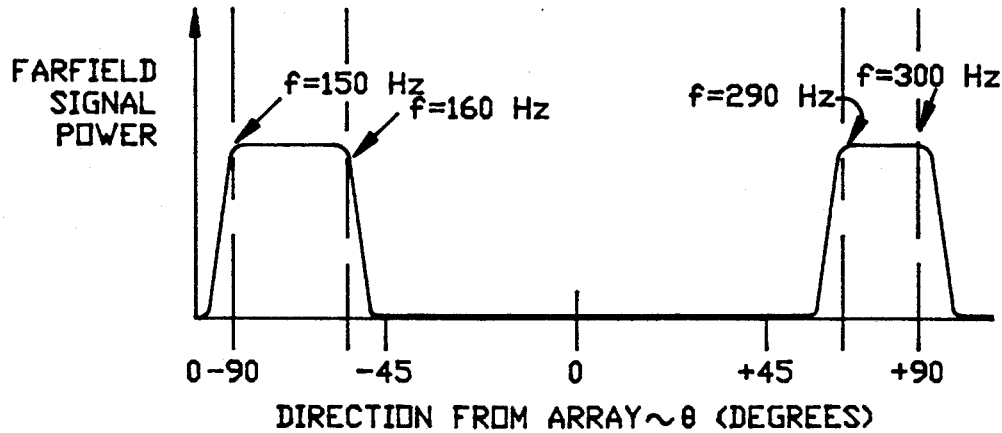
FIG. 4(d) is a diagram illustrating the beam components of the composite wave energy received in the far field when signals transmitted from a Frequency Dispersive Transmitting Array have the waveform spectrum depicted in FIG. 4(b).

FIG. 4(c) is an example of the spectrum of an input signal 36 from signal source 34 supplied to a transmitting array apparatus 30 covering subsets of the spectrum depicted in FIG. 3. If a sufficiently broad-band input signal 36 is arranged in separate frequency bands, for example one of about 150 Hz to 160 Hz and another of about 290 Hz to about 300 Hz, the far field pattern will display two distinct multiple beams containing frequencies corresponding to subsets of directions in the regions where $\theta=-90°$ and $\theta=+90°$. The transmitting array apparatus 30 will have a radiation pattern in the far field which is essentially as depicted in FIG. 4(d). One or more other frequency bands may be used to produce corresponding far-field patterns.

Figure 5C:
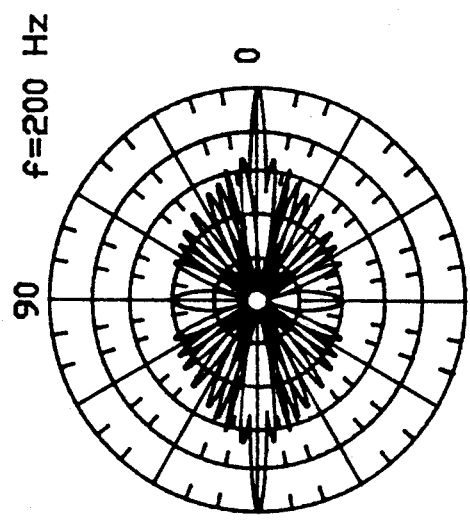
FIGS. 5(a), 5(b), 5(c), 5(d), and 5(e) are polar diagrams illustrating the radiation patterns from an unshaded Frequency Dispersive Transmitting Array.
Figure 5B:
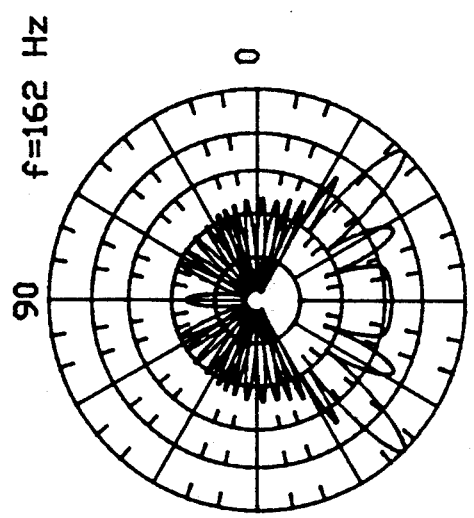
Figure 5A:
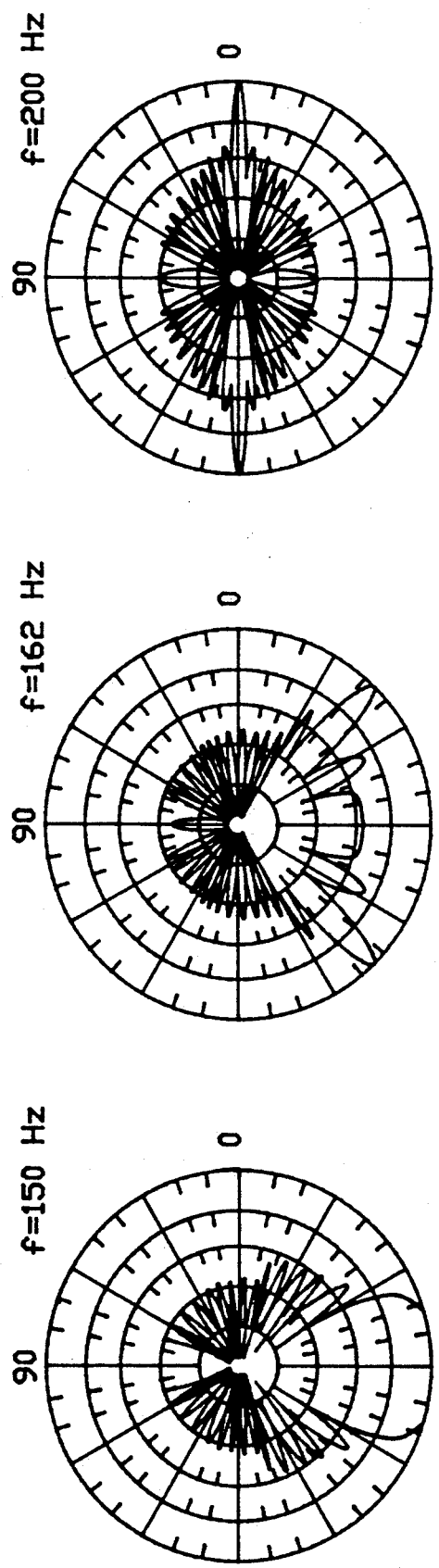
Figure 5D:
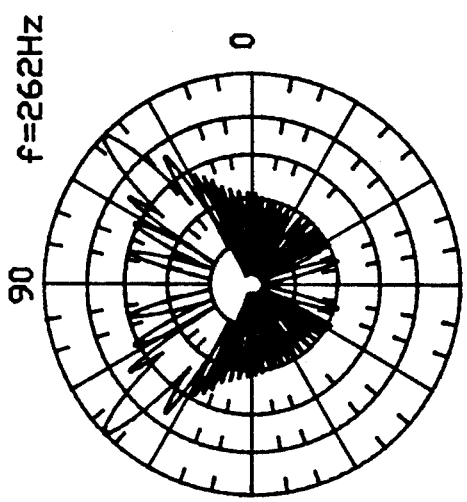
Figure 5E:
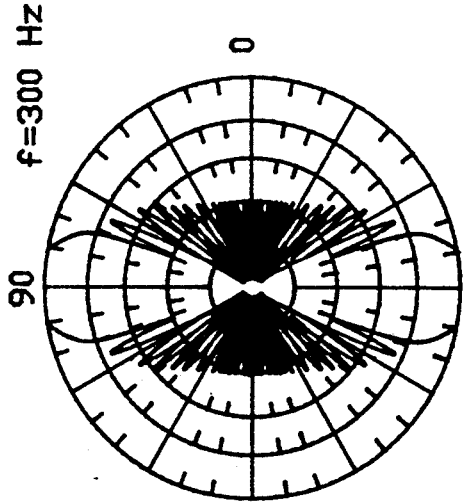

In FIGS. 5(a) through 5(e), examples of calculated radiation patterns are shown at five different frequencies for transmitting array apparatus 30 having an array 42 of thirty-one radiating elements 32, spacing d of 2.5 meters and delay time $\tau_0$ of 0.005 seconds. A longer array, for example ninety elements, may be considered for sonar applications, but using as the illustrative configuration the shorter, thirty-one element array 42 which has wider beam lobes and fewer side lobes, makes it easier to visualize the side lobe patterns. In FIG. 5(a) the 150 Hz radiation pattern has its main lobe endfire to array 42 at $\theta=-90°$. The 200 Hz radiation pattern, FIG. 5(c), is broadside to array 42. The 300 Hz radiation pattern, FIG. 5(e), is endfire to array 42 at $\theta=90°$.

Figure 6A:
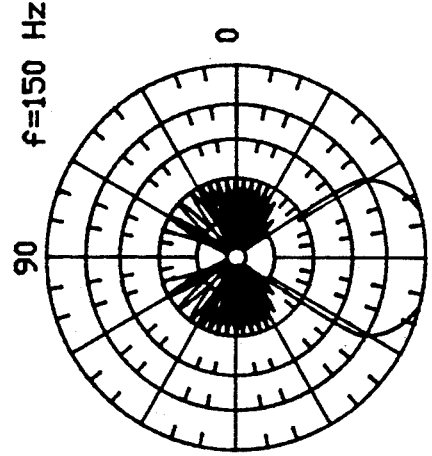
FIG. 6(a), 6(b), 6(c), 6(d) and 6(e) are polar diagrams illustrating the radiation patterns from a shaded Frequency Dispersive Transmitting Array.
Figure 6B:
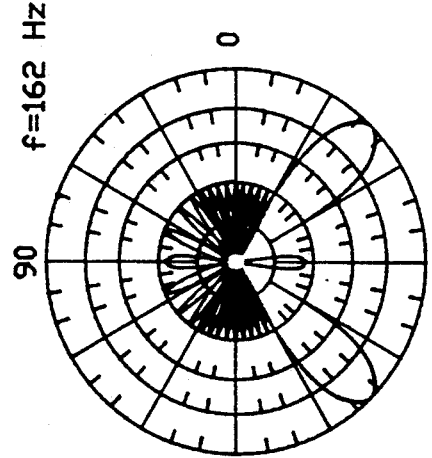
Figure 6C:
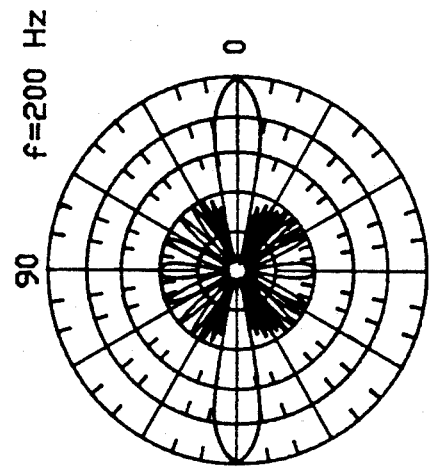
Figure 6D:
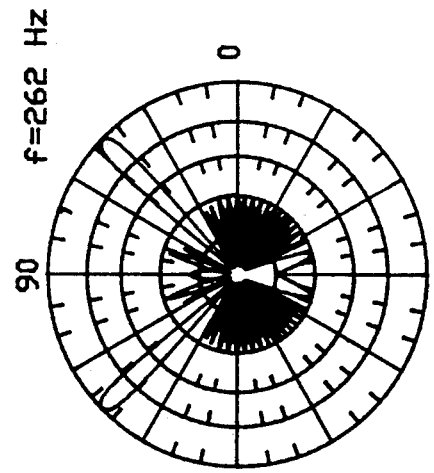
Figure 6E:
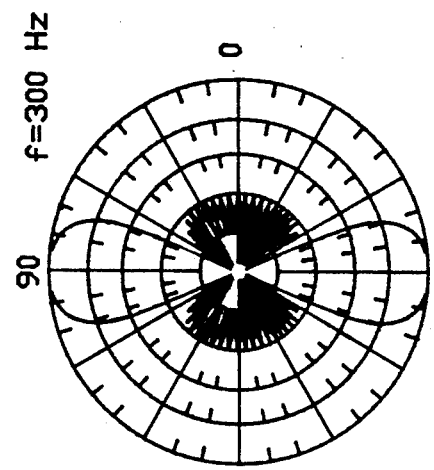

FIGS. 6(a) through 6(e) shows the calculated radiation patterns for the same transmitting array apparatus 30 as in FIGS. 5(a) through 5(e), except the radiating elements 32 are given a Dolph-Chebychev weighting. The side lobe suppression resulting from window weighting is apparent. The effect of window weighting on side lobe envelope and main lobe width is identical to the effect in a conventionally beam-formed array. The aliased main lobe at 300 Hz shown in FIGS. 5(d) and 6(e) is an artifact of this example. Selection of an appropriate number of radiating elements 32 and inter-element spacing d will eliminate the aliased lobe. Spacing d between radiating elements 32 has been selected as one-third wave length or 2.5 meters in this example, but reducing spacing d to 2.4 meters will change the frequencies of the end-fire beams to about 151 Hz and 294 Hz respectively. This is almost, but not quite an octave. There will be no aliased beam at 294 Hz. The patterns shown in FIGS. 5(a) through (e) and 6(a) through (e) are identical to those of conventionally formed narrow beams, though in this invention they are all formed simultaneously.

Figure 7:
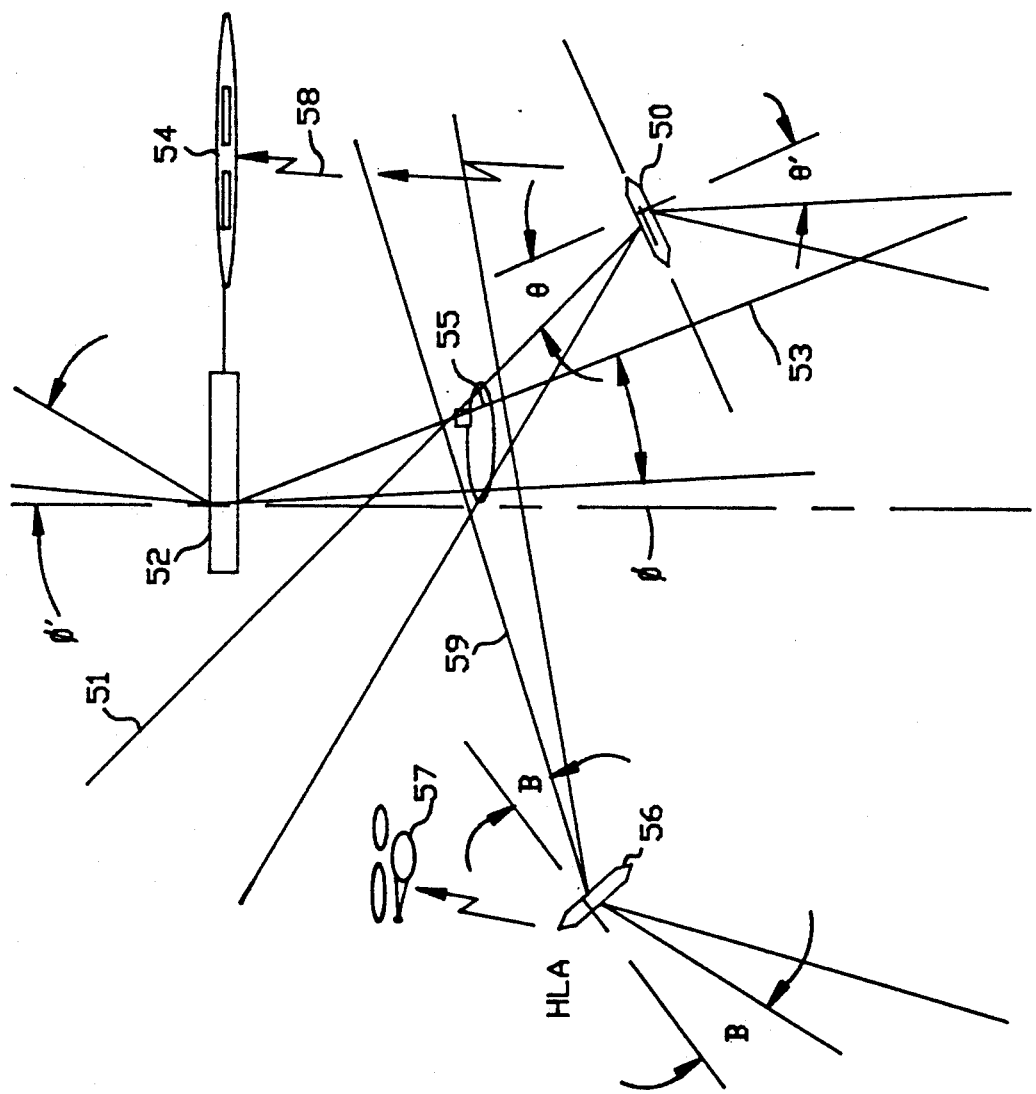
FIG. 7 is a plan-view diagram illustrating a tactical, antisubmarine warfare (ASW) application of a Frequency Dispersive Transmitting Array.

Frequency Dispersive Transmitting Arrays can be employed in anti-submarine warfare in several ways. FIG. 7 shows ship 54 towing a horizontal line receiving array 52, referred to in this discussion by the initials HLA. Another HLA 56 is deployed as an off-board sensor with a radio link to ship 54 through helicopter 57. The objective is to find submarine 55. A horizontal Frequency Dispersive Transmitting Array is deployed as a sound source array 50 and insonifies all of the surrounding ocean. Normally an echo detected by horizontal line receiving array 52 may be used to determine direction $\phi$ to target 55 with a left-right ambiguity. That is, the target 55 could be in either direction $\phi$ or direction $\phi'$ with respect to towed HLA 52. Using the present invention, direction $\theta$ to target 55 from source array 50 is additionally known, because the center frequency of the echo received from beam segment of transmitted signals 51, which reflect from target 55, is determined by direction $\theta$ from sound source array 50 to target 55, though it also has an ambiguity of complementary direction $\theta$. Knowledge of direction $\theta$ reduces the ambiguity of target 55 location from towed array 52 to one or two finite areas rather than two directions. If the transmitted signal is one with a large time-bandwidth product and detection is made using correlation processing, then beam segment of transmitted signals 51 can be synchronized by radio link 58 with received signals 53 and processed aboard ship 54.

Thus total signal propagation time information is provided which resolves the ambiguities. If transmitted beam segment 51 and received beam segment 53 are not synchronized, then further detection of reflected beam segment 59 by off-board HLA 56 permits location of target 55 by triangulation. Off-board HLA 56 can determined direction $\beta$ which, when transmitted by radio link through helicopter 57, is used to fix target 55 location.

With conventional omnidirectional sound sources, simultaneous detection of an echo on two horizontal line receiving arrays 52, 56 would enable resolution of target location ambiguities some of the time, but not necessarily in situations where receiving beams intersect on both sides of the receivers. In addition, detections will not always be made simultaneously at multiple horizontal line receiving arrays 52, 56. Use of a Frequency Dispersive Transmitting Array provides a single horizontal line receiving array 52 with the localizing capability of two horizontal line receiving arrays 52, 56 utilizing a conventional omnidirectional sound source. Furthermore, an omnidirectional sound source does not provide the discrimination against reverberation that the Frequency Dispersive Transmitting Array provides. The Frequency Dispersive Transmitting Arrays of the present invention provide directional information of a conventionally beamformed line source array, as well as the discrimination against reverberation. It also provides the fast search rate of an omnidirectional source because it simultaneously insonifies all directions.

FIG. 8 shows a plan view of the invention operating as a horizontal transmitting array 60 in conjunction with horizontal line receiving array (HLA) 66 in an ocean environment. A target is located within small area 68. Ordinarily, if long duration, large time-bandwidth product signals are radiated from a conventional omnidirectional transmitter, a large area 64 of ocean is insonified by transmitting array 60 and large area 64 would contribute to reverberation in which a target echo must be detected at any instant of time. Such reverberation interferes substantially with detection at HLA 66 of reflected segment of transmitted beam 70 from target 68. However, by utilizing a suitable Frequency Dispersive Transmitting Array as a sound-source horizontal transmitting array 60, a target within area 68 is insonified at a frequency representing direction $\theta$ from transmitting array 60. Only reflections from the very small area 68 of ocean insonified at frequencies corresponding to direction $\theta$ contribute to reverberation that affects detection of the target. The ability of the invention to suppress reverberation is similar to that of a conventional beam-formed transmitting source, but there is no necessity to search the ocean with a narrow beam because the invention simultaneously forms virtually an infinite number of beams over angles $-90°$ to $+90°$ with respect to the broadside direction from horizontal transmitting array 60.

FIG. 9 illustrates a further use of the Frequency Dispersive Transmitting Array in an underwater environment. Vertical transmitting array 80 is operating in shallow water and at short range from submerged target 88. When an echo is detected from submerged target 88 and if the range between transmitting array 80 and target 88 is determined, the launch angles of the Eigenrays from the transmitting array 80 to target 88 can be estimated. The depth of target 88 may be then be estimated by use of ray tracing techniques.

When the invention is used in a mono-static sonar with a VLA source and an omnidirectional receiver, the time of arrival of the echo from the target 88 is used to determine range R to the target. In a bi-static application, the time of arrival determines an ellipse of possible target locations. The echo must be detected on multiple receivers ($\geq 3$) of a multi-static sonar system in order to determine the azimuth of target 88. In such systems, as in the mono-static system case, once target 88 is localized, ray tracing techniques and different frequencies at different source angles can be used to estimate the depth of target 88.

FIG. 9 also depicts the value of using a Frequency Dispersive Transmitting Array in a mono-static sonar to help discriminate against reverberation. Utilizing sufficiently short time duration signals allows such discrimination. Primarily, it is the sea surface 86 and sea bottom 84 in the vicinity of the target which contributes to reverberation in which the target echo is embedded.

In FIG. 9 the solid lines show paths 90 from transmitting array 80 to target 88 that would generate a target echo. The long dashed lines show signal paths 92 that would generate reverberation from surface 86 near the time of receiving the target echo. The short dashed lines are signal paths 94 that would generate reverberation from bottom 84. If target 88 is well separated from bottom 84, echoes received from surface 86 or bottom 84 are incident from different angles to the transmitting array 80 axis. These echoes differ in frequency from the echo received from the target 88. Target 88 may therefore be discriminated from the reverberation by the echo frequency.

In addition to the sonar applications illustrated above, the Frequency Dispersive Transmitting Array may be applied in other widely diverse areas such as aircraft landing systems, collision avoidance, rapid scanning radar, or medical ultrasonic imaging, to name just a few.

Application of the Frequency Dispersive Transmitting Array to aircraft instrument landing systems is illustrated in FIG. 10. In FIG. 10, aircraft 102 approaches the runway on glide path 104 which is defined by a vertically oriented transmitting array 100. Radiating element spacing, number of elements, inter-element timing and input signal would be selected so the radiation pattern fills the region of the aircraft's approach. The angle $\theta$ of the current glide path 106 and direction to the desired glide path 104 is determined by a receiver on aircraft 102 which detects the frequency content $f_1$ of signals transmitted from transmitting array 100 along higher glide path 106. If the aircraft were too low, it would receive signals $f_2$ transmitted along lower glide path 108. A similar array, oriented horizontally could provide simultaneous information of relative bearing or azimuth to the runway. The aircraft receiver detects the frequency content of transmitted signals from the horizontal array in a manner similar to that used for desired glide path 104 determination.

In the sonar application described earlier, order number m was taken as one (1). However, in radio-frequency applications such as the instrument landing system described above, it would often be appropriate to use larger values of m. In the instrument landing system, a center frequency $f_0$ on the order of 1000 MHz might be selected for glide path 104. The wavelength at this frequency is about 30 centimeters. If the radiating elements of the transmitting array were spaced at one (1) wavelength and a fifteen-degree wide radiation pattern for the glide slope or azimuth were used, the radiated band of frequencies would span 560 MHz for m=1. But if m=10, the frequency band would span only 52 MHz. After selecting a center frequency $f_0$, a combination of radiating element spacing d, spectrum order number m (or time delay $\tau_0$) can be chosen so the system will use its authorized frequency band to best advantage.

Collision avoidance systems for aircraft (or other vehicles) is another potential application of the disclosed invention. Aircraft equipped with the disclosed invention could monitor relative bearing to other aircraft in all directions at once because of the unique ability of the present invention to cover simultaneously a wide field. An aircraft equipped with a system employing a Frequency Dispersive Transmitting Array could determine relative bearing to the flight path of any similarly equipped aircraft. If another aircraft is detected and the rate of change of bearing to that aircraft is zero, a potential for collision is indicated and the pilot would be alerted to take evasive action.

Rapid scanning radar is another application which can take advantage of the unique ability of the Frequency Dispersive Transmitting Array to cover a wide-angle spread of wave energy while emulating narrow, radiated beams having narrow frequency bands. Each individual transmission of signals would cover a broad sector within which are the beam patterns for narrow frequency bands. The receiving elements of the system would be an array limited in aperture so as to cover a similar sector without beam-forming. The center frequency of any echo determines the direction of the target reflecting the transmitted beam with a resolution of the width of the narrow-band beam from the transmitting array.

In a medical acoustics application of the invention, a system could be made for rapidly constructing a three-dimensional representation of a structure, internal to the body, which may be moving. This could be achieved by using a Frequency Dispersive Transmitting Array on an axis orthogonal to a conventionally beam-formed linear receiving array. The two arrays would form multiple fan-shaped beams which would cross each other. The individual transducers might be impulse devices so that the transmitted signals would be of short duration. After transmission of a frequency dispersive pulse, the output from the receiving beam-former would have three dimensions: Time, representing the distance from the transmitting transducer to an acoustic impedance discontinuity; frequency, representing direction relative to the axis of the Frequency Dispersive Transmitting Array; and the conventional beam number representing direction relative to the axis of the receiving array. A rapid construction of a three-dimensional representation of internal body structure could then be made, even if the body structure was moving.

Although the present invention has been described in detail with reference to a particular preferred embodiment, and alternate embodiments, persons possessing ordinary skill in the art to which this invention pertains, will appreciate that various modifications and enhancements may be made without departing from the spirit and scope of the invention.

LIST OF REFERENCE NUMERALS

FIG. 1(a)

10 Propagating composite wave energy
20 Narrow-band beam
30 Transmitting array apparatus
32 Radiating elements
34 Signal source
36 Input signals
37 Feedline
38 Time delay device
40 Window weighting function device
42 Array $\theta$ Direction from array to receiver
$\tau_0$ Delay time

FIG. 1(b)

32 Radiating elements
34 Signal source
37-1 feedline to radiating line
37-2 to 37-n feedline to radiating elements
38-1 First time delay device
38-2 Second time delay device
40 Window weighting functon device
43 Radiating line
X X-direction of array
Y Y-direction of array

FIG. 2

32 Radiating elements
46 Path of narrow-band beam to receiver
$\theta$ Direction from array to receiver
d Spacing between radiating elements
X X-axis-of array

FIG. 3 f Transmitted frequency
$f_0$ Dominant frequency

|g(ω)|² Transmitted signal power

FIG. 4(a)

θ Direction from array to receiver
Main beam lobe center frequency

FIG. 4(b)

f Received signal frequency
f₀ dominant frequency

FIG. 4(c)

|g(ω)|² Transmitted signal power
f Transmitted frequency

FIG. 4(d)

f Received signal frequency
θ Directon from array

FIG. 7

50 Sound source transmitting array
51 Beam segment of transmitted signals
52 Horizontal line receiving array towed by ship
53 Received beam segment reflected from a target
54 Ship having signal processing capabilities
55 Target
56 Off-board horizontal line receiving array
57 Helicopter 58 Radio link from transmitting array to tow ship
59 Beam segment received from a target
θ Direction from array to towed receiver
' Direction of complementary beam segment from transmitting array
φ Direction from towed receiving array to a target
φ' Complementary direction from towed receiving array to a target
β Direction from off-board receiving array to a target
β' Complementary directon from off-board receiving array to a target

FIG. 8

60 Horizontal transmitting array
62 Beam segment transmitted in the area of a target
64 Insonified area of water
66 Horizontal line receiving array
68 Target area
70 Beam segment received from the area of a target
72 Complimentary beam segment transmitted
74 Complimentary beam segment received
θ Direction from transmitting array to target
θ' Complimentary direction from transmitting array

FIG. 9

80 Vertical transmitting array
82 Axis of transmitting array
84 Sea bottom
86 Sea surface
88 Target
90 Segments of transmitted beam generating a target echo
92 Segments of transmitted beam generated surface reverberation
94 Segments of transmitted beam generating bottom reverberation

FIG. 10

100 Transmitting array
101 Transmitting array axis
102 Landing aircraft

104 Segment of transmitted beam along glide slope
106 Segment of transmitted beam above glide slope
108 Segment of transmitted beam below glide slope
θ Direction of glide slope from transmitting array
f₀ Center frequency of glide path
f₁ Frequency of beam segment 106 above glide path
f₂ Frequency of beam segment 108 below glide path

What is claimed is:

1. An apparatus for propagating composite wave energy comprised of a plurality of components each having a frequency of wave motion which is a function of a direction in which each of said components is propagated, comprising:
    radiating means for radiating said composite wave energy, said radiating means having a plurality of radiating elements comprising an array;
    signal-generating means for generating broad-band signals in a selected band of frequencies;
    time-delay means for providing a time delay between the emission of said broad-band signals from each successive one of said plurality of said radiating elements, said time-delay means being coupled between successive ones of said plurality of said radiating elements and having a delay time which is a multiple of the period of the dominant frequency radiated in a direction broadside to said array;
    said array having a radiation pattern;
    said signal-generating means being coupled to and driving said radiating means through said time delay means; and
    window weighting function means for controlling the behavior of said radiation pattern of said array, said window weighting function means being coupled between said signal generating means and each of said radiating elements.

2. The apparatus of claim 1 wherein said radiating elements are arranged uniformly in said array.

3. An apparatus as claimed in claim 1 in which said composite wave energy emulates a plurality of simultaneously-radiated narrow-band beams, each one of said emulated narrow-band beams being radiated in a direction and each having a different center frequency.

4. An apparatus as claimed in claim 3 in which said direction of each said emulated narrow-band beam corresponds to an angle between −90° and +90° from a broadside direction to said array.

5. An apparatus as claimed in claim 1 in which said composite wave energy has the characteristics of sound.

6. An apparatus as claimed in claim 5 in which said radiating elements comprise acoustic radiators.

7. An apparatus as claimed in claim 1 in which the said propagating composite wave energy has the characteristics of electromagnetic radiation.

8. An apparatus as claimed in claim 7 in which said radiating elements comprise electromagnetic radiators.

9. An apparatus as claimed in claim 1 in which said time-delay means comprises a plurality of L-C circuits.

10. An apparatus as claimed in claim 1 in which said time-delay means comprises a plurality of delay-line circuits.

11. An apparatus as claimed in claim 1 in which said time-delay means comprises a plurality of serpentine feedlines.

12. A frequency dispersive beam forming apparatus for transmitting a radiation pattern of composite wave energy having the characteristics of a plurality of narrow-band beams, each of said narrow-band beams having a center frequency which is a function of a direction in which each of said narrow-band beams is propagated, comprising:

a signal source having an output of broad-band signals in a selected band of frequencies;

a transmitting array having a plurality of radiating elements;

a plurality of time-delay devices, each of said time-delay devices having a delay time which is a multiple of the period of the dominant frequency radiated from a direction broadside to said array, each of said time-delay devices being coupled between successive ones of said plurality of said radiating elements;

said array having a radiation pattern characterized by a plurality of main lobes and of sidelobes;

said signal source being coupled to each of said radiating elements of said transmitting array through said time-delay devices by a feedline; and a plurality of window weighting function devices each of said window weighting devices being coupled between said signal source and one of said radiating elements by said feedline.

13. An apparatus as claimed in claim 12 wherein said radiating elements are uniformly arranged in said array.

14. An apparatus as claimed in claim 12 in which said main lobes of each of said narrow-band beams have a direction corresponding to an angle between $-90°$ and $+90°$ from a broadside direction to said array.

15. An apparatus as claimed in claim 12 in which said selected band of frequencies of said output signals comprises acoustic frequencies.

16. An apparatus as claimed in claim 12 in which said selected band of frequencies of said output signals comprises frequencies in the electro-magnetic spectrum.

17. An apparatus as claimed in claim 12 in which each of said time-delay devices comprises L-C circuit elements.

18. An apparatus as claimed in claim 12 in which each of said time-delay device comprises delay-line circuit elements.

19. An apparatus as claimed in claim 12 in which each of said time-delay devices comprises a serpentine wave guide.

20. A method for propagating composite wave energy comprised of a plurality of components each having a frequency of wave motion which is a function of a direction ($\theta$) in which each of said components is propagated, comprising the steps of:

providing a transmitting array of radiating elements, said array having a radiation pattern;

generating broad-band signals in a selected band of frequencies;

feeding said broad-band signals be a feedline to each successive one of said plurality of said radiating elements through a time-delay device;

delaying the emission of replicas os faid broad-band signals radiated by each successive one of said radiating elements by a delay time, said delay time being a multiple of the period of the dominant frequency radiated from a direction broadside to said array; and generating a window weighting function modifying said broad-band signals before emission, thereby controlling the behavior of said radiation pattern of said array.

21. The method of claim 20 wherein said step of generating a window weighting function, modifying said broad-band signals before emission, includes controlling the side lobe envelope and main lobe shape of said radiation pattern of said array.

22. The method of claim 20 wherein said step of generating broad-band signals comprises generating a spectrum of broad-band signals which will radiate composite wave energy in all directions between an angle of $-90°$ and $+90°$ from a broadside direction to said array.

23. The method of claim 20 wherein said step of generating braod-band signals comprises generating a spectrum of broad-band signals confined to a subset of frequencies of broad-band signals smaller than the spectrum of broad-band signals which will radiate composite wave energy in all directions between an angle of $-90°$ and $+90°$ from a broadside direction to said array.

24. The method of claim 20 wherein said radiating elements are uniformly arranged in said array.

25. A method of emulating a plurality of narrow-band beams radiated simultaneously in all directions from a broadside direction of a transmitting array each of said narrow-band beams having a center frequency corresponding to a direction in which each is emitted, comprising the steps of:

providing a plurality of radiating elements arranged in an array, said array having a radiation pattern characterized by a main lobe and side lobes;

providing broad-band signals to said array in a band of frequencies which will radiate said composite wave energy in all directions between an angle of $-90°$ and $+90°$ from a broadside direction to said array;

providing a feedline to each of said radiating elements;

providing a plurality of time-delay devices each of which is disposed in said feedline between successive ones of said plurality of said radiating elements, each of said time-delay devices having a delay time which is a multiple of the period of the dominant frequency radiated in a direction broadside to said array; and feeding said broad-band signals to each successive one of said radiating elements of said array through said time-delay devices so as to delay emission of said broad-band signals from each said successive one of said radiating elements.

26. The method of claim 25 wherein said radiating elements are arranged uniformly in said array.

27. The method of claim 25 wherein said step of generating broad-band signals comprises generating a spectrum of broad-band signals confined to a subset of frequencies of broad-band signals smaller than the spectrum of broad-band signals which will radiate composite wave energy in all directions between an angle of $-90°$ and $+90°$ from a broadside direction to said array.

* * * * *